United States Patent
Ohmori

(10) Patent No.: US 11,016,365 B2
(45) Date of Patent: May 25, 2021

(54) LENS APPARATUS AND IMAGING SYSTEM USING THE SAME

(71) Applicant: CANON KABUSHIKI KAISHA, Tokyo (JP)

(72) Inventor: Katsumi Ohmori, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/658,263

(22) Filed: Oct. 21, 2019

(65) Prior Publication Data

US 2020/0133096 A1 Apr. 30, 2020

(30) Foreign Application Priority Data

Oct. 31, 2018 (JP) .............................. JP2018-204693

(51) Int. Cl.
*G03B 17/14* (2021.01)
*H04N 5/225* (2006.01)

(52) U.S. Cl.
CPC ........... *G03B 17/14* (2013.01); *H04N 5/2254* (2013.01); *H04N 5/2253* (2013.01)

(58) Field of Classification Search
None
See application file for complete search history.

(56) References Cited

U.S. PATENT DOCUMENTS

| 4,457,608 A * | 7/1984 | Komoto et al. | G02B 7/102 348/345 |
| 5,291,232 A * | 3/1994 | Kobayashi et al. | G03B 1/56 396/87 |
| 2005/0212949 A1* | 9/2005 | Tokiwa et al. | G03B 17/00 396/532 |
| 2007/0077063 A1* | 4/2007 | Tokiwa | G03B 17/14 396/532 |
| 2012/0287328 A1* | 11/2012 | Kawai | G02B 7/102 348/345 |
| 2015/0049244 A1* | 2/2015 | Tokunaga | G03B 17/14 348/375 |
| 2018/0164603 A1* | 6/2018 | Taguchi | G02B 27/646 |
| 2020/0133096 A1* | 4/2020 | Ohmori | G03B 17/14 |

FOREIGN PATENT DOCUMENTS

| JP | 2006039374 A | 2/2006 |
| JP | 2009175185 A | 8/2009 |
| JP | 2014092565 A | 5/2014 |
| JP | 2016173606 A | 9/2016 |
| JP | 2018081116 A | 5/2018 |

* cited by examiner

*Primary Examiner* — William B Perkey
(74) *Attorney, Agent, or Firm* — Rossi, Kimms & McDowell LLP

(57) ABSTRACT

A lens apparatus includes a conductive mount member, and a nonconductive fixed member fixed onto the mount member and having a conductive pattern.

16 Claims, 4 Drawing Sheets

LENS APPARATUS AND IMAGING SYSTEM USING THE SAME

BACKGROUND OF THE INVENTION

Field of the Invention

The present invention relates to a lens apparatus configured to prevent influence of static electricity and an imaging system using the same.

Description of the Related Art

A conventional lens apparatus, such as an interchangeable lens, includes an electric circuit board that controls an operation of the lens apparatus and performs a variety of calculations. When static electricity from the outside or generated inside the lens apparatus flows through the electric circuit board, the electric circuit board malfunctions due to the influence of an electrostatic induction, electromagnetic induction, etc. Accordingly, a lens apparatus has been proposed which suppresses a malfunction by transmitting the static electricity of the lens apparatus to an imaging apparatus body.

Japanese Patent Laid-Open No. ("JP") 2009-175185 discloses a lens barrel (lens apparatus) that transmits static electricity generated in a barrel unit to a ground of an imaging apparatus body through a conductive line of a flexible substrate. JP 2014-92565 discloses an interchangeable lens barrel (lens apparatus) that disposes a conductive elastic member between an operation ring that moves in the optical axis direction and a mount, provides an electric conduction between them, and transmits static electricity from the mount to the imaging apparatus body.

The lens apparatus disclosed in JP 2009-175185 needs, if a distance from the component to be electrically connected to the imaging apparatus body is long, to avoid another intervening component. Hence, the lens apparatus becomes larger, and the assembly performance may lower due to the complicated routing of the flexible substrate. The lens apparatus disclosed in JP 2014-92565 requires a space for the elastic member, which may make larger the lens apparatus and lowers its strength.

SUMMARY OF THE INVENTION

The present invention provides a lens apparatus and an imaging system, each of which is compact and resistant to static electricity.

A lens apparatus according to one aspect of the present invention includes a conductive mount member, and a nonconductive fixed member fixed onto the mount member. The fixed member has a conductive pattern.

An imaging system according to another aspect of the present invention includes the above lens apparatus, and an imaging apparatus to which the lens apparatus is attached via the mount member.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1A:
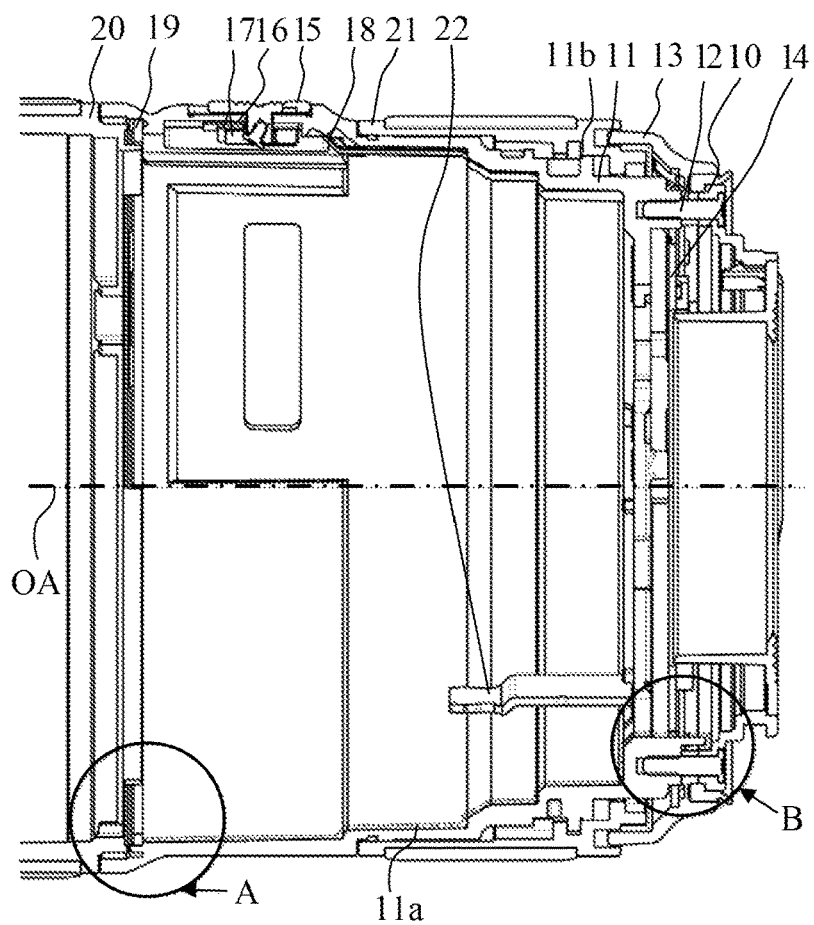
FIGS. 1A to 1C are sectional views of a lens apparatus according to a first embodiment.
Figure 1B:
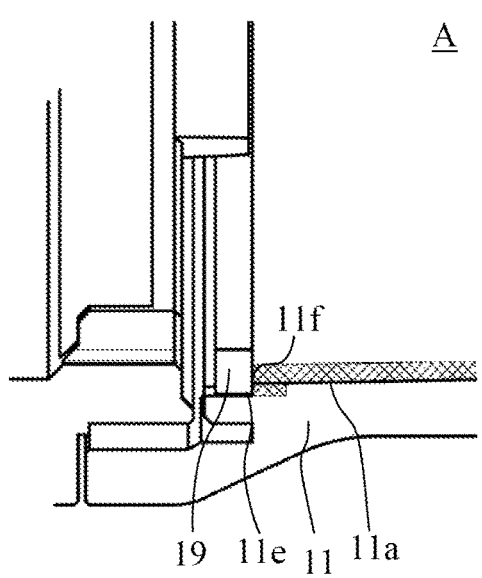
Figure 1C:
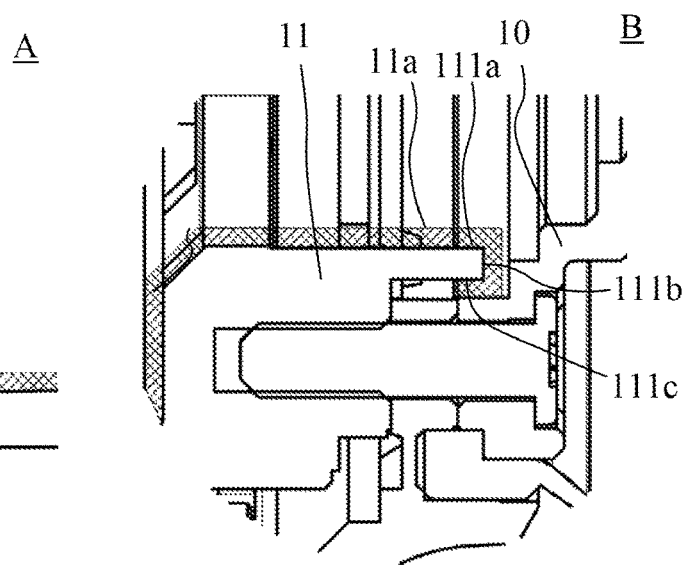

Referring now to FIGS. 1A to 1C, a description will be given of a lens apparatus (interchangeable lens) according to a first embodiment of the present invention. FIGS. 1A to 1C are sectional views of the lens apparatus 100. FIG. 1A is a sectional view of principal part of the lens apparatus 100, FIG. 1B is an enlarged view of an area A in FIG. 1A, and FIG. 1C is an enlarged view of an area B in FIG. 1A. The lens apparatus 100 is an interchangeable lens attachable to and detachable from an imaging apparatus (camera body).

The lens apparatus 100 has a mount member 10 through which the lens apparatus 100 is detachably attached to the imaging apparatus. The mount member 10 is made of a metal such as conductive brass, and is fixed to a fixed cylinder (fixed member) 11 made of a PC (polycarbonate) nonconductive member using a screw 12. The mount member 10 may be made of not only a metal but also another conductive material such as carbon. A mount ring 13 made of a PC-based nonconductive member is disposed between the mount member 10 and the fixed cylinder 11. A cutting work of a contact surface of the mount ring 13 with the fixed cylinder 11 for a back adjustment.

An electric circuit board 14 is fixed in the fixed cylinder 11. The electric circuit board 14 is mounted with a control circuit for controlling the operation of the lens apparatus 100 and for performing a variety of calculations. The fixed cylinder 11 is immovable (fixed) during zooming and focusing. A switch knob 15 is supported on the fixed cylinder 11 movably in a direction along an optical axis OA (optical axis direction). The switch knob 15 can move a slide terminal of a slide switch 17 in the optical axis direction via a connecting member 16. The slide switch 17 is mounted on a flexible substrate 18. A terminal portion of the flexible substrate 18 is connected to a connector mounted on the electric circuit substrate 14. The AF/MF (autofocus/manual focus) of the lens apparatus 100 can be switched by moving the switch knob 15 in the optical axis direction.

A reinforcing ring (first conductive member) 19 is fixed onto the inner circumferential side of the fixed cylinder 11 at contact portions 11e and 11f. The reinforcing ring 19 is made of a conductive aluminum alloy and contributes to improving the rigidity of the fixed cylinder 11. On the front side of the fixed cylinder 11, a focus operation ring 20 made of a PC-based nonconductive member is supported by an unillustrated fixed member so as to be rotatable at a fixed position. A gap is formed between the focus operation ring 20 and the fixed cylinder 11. The user can provide focusing at an arbitrary position by rotating the focus operation ring 20. In this embodiment, conductive grease may be applied to contact portions 11e and 11f of the fixed cylinder 11.

A zoom operation ring (second conductive member) 21 made of a conductive aluminum alloy is supported on the outer circumferential side of the fixed cylinder 11 rotatably at a fixed position relative to an engagement portion (contact part) 11b of the fixed cylinder 11. The zoon operation ring 21 rotates around the optical axis direction and moves the zoom lens (optical element) in the optical axis direction. A zoom key 22 is screwed onto the zoom operation ring 21. The zoom key 22 is made of conductive carbon steel, and its one end is engaged with an unillustrated cam ring. The cam ring supports the imaging optical system of the lens apparatus 100. The user can select an arbitrary focal length by rotating the zoom operation ring 21.

A description will be given of static electricity applied from the outside to the vicinity of the gap formed in the lens apparatus 100. The static electricity applied to the lens apparatus 100 applies through the gap to the reinforcing ring 19 disposed near the gap. If there is no conductive member that contacts the reinforcing ring 19, the static electricity may be applied to the flexible substrate 18 disposed near it and reach the electric circuit board 14. As a result, the electric circuit board 14 may be negatively affected, such as malfunctioning, etc.

In this embodiment, the fixed cylinder 11 has a conductive pattern 11a (hatched portion in the figure). The conductive pattern 11a contacts the reinforcing ring 19 and the mount member 10. Even when static electricity is applied to the reinforcing ring 19, this structure can transmit it to the ground (GND) of the imaging apparatus via the mount member 10, and can consequently suppress the malfunction of the electric circuit board 14. This embodiment forms the conductive pattern 11a on the fixed cylinder 11 for an electric connection between the mount member 10 and the reinforcing ring 19. Hence, this embodiment does not require an dedicated component for the electric connection. In other words, since a space for a dedicated component is unnecessary, the lens apparatus 100 does not become large and can be made resistant to static electricity.

This embodiment makes the conductive pattern 11a, for example, through a plating process of a conductive material. The conductive pattern 11a is formed across a plurality of surfaces of the fixed cylinder 11, and can be formed across surfaces 111a, 111b, and 111c orthogonal to one another as illustrated in FIGS. 1A to 1C. For example, when the mount member 10 and the reinforcing ring 19 are electrically connected to each other using a conductive sheet or a flexible substrate, the conductive sheet pasted on orthogonal surfaces may peel off. This embodiment does not cause peeling, or does not need a countermeasure for peel-off such as an adhesive and screwing, so that working efficiency improves.

Changing the material of the fixed cylinder 11 to a conductive member such as carbon can provide the same effect as that of this embodiment, but this embodiment can set the conductive pattern 11a formed on the fixed cylinder 11 at an arbitrary position. The fixed cylinder 11 made of the conductive material may cause a neighboring electronic circuit or circuit component to malfunction due to the influence of the static electricity. On the other hand, this embodiment makes the fixed cylinder 11 of a nonconductive material, and as illustrated in FIG. 1A, even if the slide switch 17 and the flexible substrate 18 are arranged on the fixed cylinder 11, the conductive pattern 11a of the fixed cylinder 11 can be placed apart from them. Thus, even if static electricity is applied to the fixed cylinder 11, the malfunction of the electronic circuit or circuit component can be suppressed.

Second Embodiment

Figure 2A:
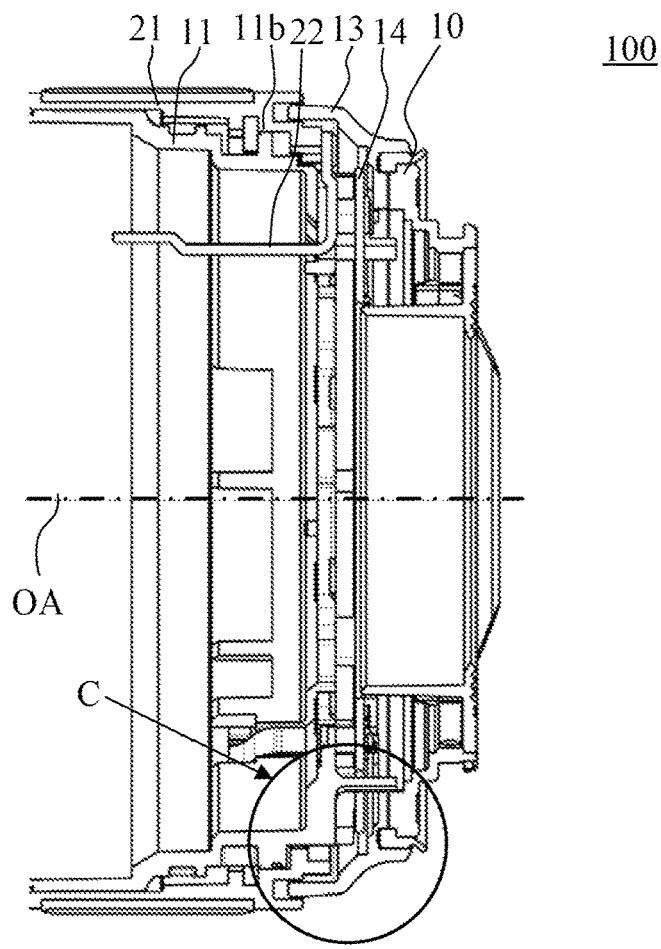
FIGS. 2A and 2B are sectional views of a lens apparatus according to a second embodiment.
Figure 2B:
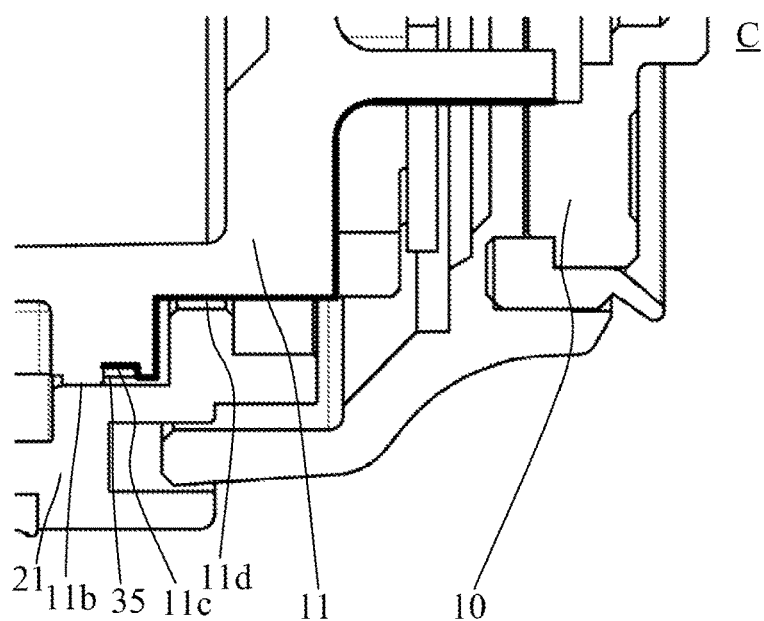
Figure 3A:
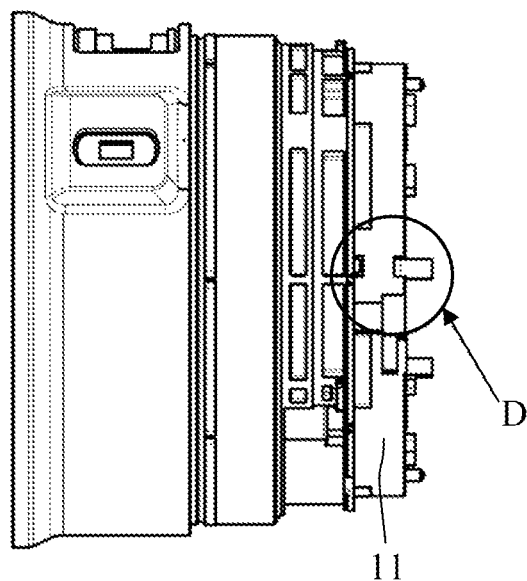
FIGS. 3A and 3B are side views of a fixed cylinder according to the second embodiment.
Figure 3B:
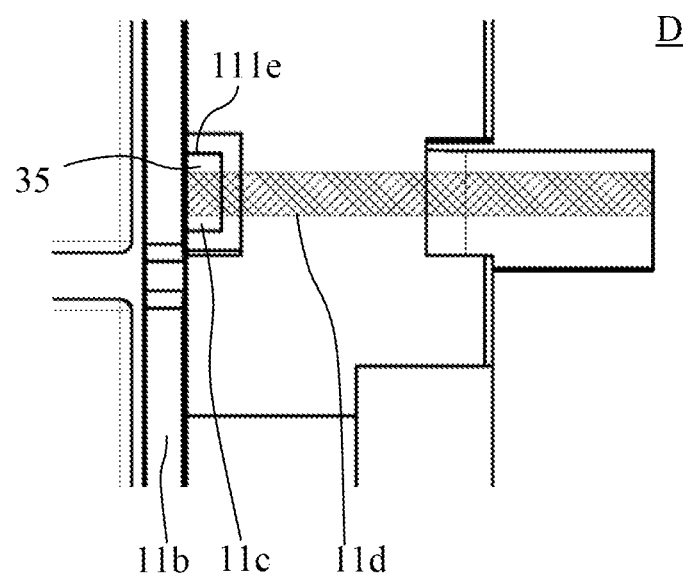

Referring now to FIGS. 2A, 2B, 3A, and 3B, a description will be given of a lens apparatus (interchangeable lens) according to a second embodiment of the present invention. FIG. 2A is a sectional view of principal part of the lens apparatus, and illustrates a section different from FIG. 1A. FIG. 2B illustrates an enlarged view of an area C in FIG. 2A. FIG. 3A is a side view of the fixed cylinder 11, and FIG. 3B is an enlarged view of an area D in FIG. 3A. In this embodiment, those elements which have the same functions or roles as those in the first embodiment will be designated by the same reference numerals as those in the first embodiment, and a description thereof will be omitted.

A description will be given of static electricity applied to the zoom operation ring (conductive member) 21 of the lens apparatus 100 from the outside. When there is no conductive member that contacts the zoom operation ring 21, the static electricity is applied to the zoom key 22 fixed onto the zoom operation ring 21. Since the electric circuit board 14 is disposed near the zoom key 22, the static electricity reaches the electric circuit board 14, and consequently the electric circuit board 14 may be negatively affected by the malfunction.

This embodiment applies conductive grease 35 between the zoom operation ring 21 and the engagement portion (contact portion) 11b of the fixed cylinder 11. The conductive grease 35 is also applied to a recess 11c formed near the engagement portion 11b of the fixed cylinder 11 (such as an area adjacent to the engagement portion 11b). A conductive pattern 11d (thick line portions in FIG. 2B, hatched portion in FIG. 3B) is formed on the recess 11c of the fixed cylinder 11. The conductive pattern 11d is connected to the contact portion with the mount member 10. Thus, the zoom operation ring 21 can be electrically connected to the mount member 10 via the conductive grease 35 and the conductive pattern 11d.

Thereby, even when static electricity is applied to the zoom operation ring 21, the static electricity can be transmitted to the around (GND) of the imaging apparatus via the mount member 10, and the malfunction of the electric circuit board 14 can be suppressed. The conductive grease 35 is also applied to the recess 11c in the fixed cylinder 11. As illustrated in FIG. 3B, the recess 11c is covered with a wall 111e so as to prevent the conductive grease 35 from flowing out. Hence, the electric connection between the zoom operation ring 21 and the conductive pattern 11d can always be maintained.

Third Embodiment

Figure 4:
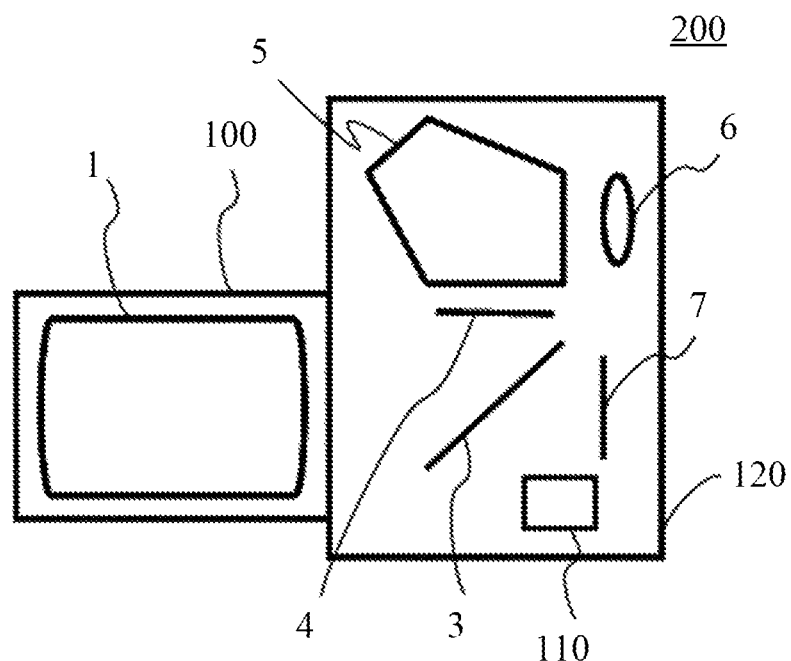
FIG. 4 is a configuration diagram of an imaging apparatus according to a third embodiment.

Referring now to FIG. 4, a description will be given of an imaging apparatus (camera system or imaging system) according to a third embodiment of the present invention. FIG. 4 is a configuration diagram of an imaging apparatus 200 (single-lens reflex camera) as a camera system. In FIG. 4, a lens apparatus (interchangeable lens) 100 includes an imaging optical system 1 (lens unit). The camera body 120 (imaging apparatus) includes a quick return mirror 3, a focus screen 4, a penia dach prism 5, an eyepiece lens 6, and the like. The quick return mirror 3 upwardly reflects a light beam formed via the imaging optical system 1. The focus screen 4 is disposed at an imaging position of the imaging optical system 1. The penta dach prism 5 converts a reverse image formed on the focus screen 4 into an erect image. The user can observe the erect image through the eyepiece lens 6. The camera body 120 holds an image sensor 7.

The image sensor 7 includes a CCD sensor and a CMOS sensor, photoelectrically converts an optical image (object image) formed via the imaging optical system 1, and outputs image data. In capturing an image, the quick return mirror 3 is retracted from the optical path, and an optical image is formed on the image sensor 7 via the imaging optical system 1. A control unit 110 has a CPU and controls the operation of each component in the imaging apparatus 200.

The imaging apparatus 200 includes the camera body 120 having the image sensor 7 and the lens apparatus 100 that is detachably attached to the camera body 120, but the present invention is not limited to this embodiment. An imaging apparatus may include the camera body and the lens apparatus integrated with each other via the mount member, or may be a single-lens non-reflex camera (mirrorless camera) having no quick return mirror.

Each embodiment can provide a lens apparatus and an imaging system that are compact and more resistant to static electricity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the fixed member may include a fixed cylinder (first fixed member) 11 and a mount ring (second fixed member) 13, and the conductive pattern may be formed on at least one of the fixing cylinder 11 and the mount ring 13. In other words, the conductive pattern may be formed not only on the fixed cylinder 11 but also on the mount ring 13. In this case, one end of the conductive pattern formed on the mount ring 13 has a contact portion with the conductive pattern formed on the fixed cylinder 11, and the other end has a contact portion with the mount member 10 so as to provide the same effect. The conductive pattern may be formed only on the mount ring 13 and may not be formed on the fixed cylinder 11.

This application claims the benefit of Japanese Patent Application No. 2018-204693, filed on Oct. 31, 2018, which is hereby incorporated by reference herein in its entirety.

What is claimed is:

1. A lens apparatus comprising:
a conductive mount member; and
a nonconductive fixed member fixed on the mount member,
wherein the fixed member has a conductive pattern formed on a plurality of surfaces of the fixed member.

2. A lens apparatus comprising:
a conductive mount member; and
a nonconductive fixed member fixed on the mount member,
wherein the fixed member has a conductive pattern,
wherein the lens apparatus further comprises a conductive member, and
wherein the mount member and the conductive member are electrically connected to each other via the conductive pattern.

3. The lens apparatus according to claim 2, wherein the fixed member and the conductive member contact each other via the conductive pattern.

4. The lens apparatus according to claim 2, wherein the conductive member is disposed on an inner circumferential side of the fixed member.

5. The lens apparatus according to claim 2, wherein the fixed member and the conductive member contact each other via the conductive pattern and conductive grease.

6. The lens apparatus according to claim 5, wherein a recess is formed in the fixed member, the recess being configured to accommodate the conductive grease.

7. The lens apparatus according to claim 2, wherein the conductive member is a zoom operation ring.

8. The lens apparatus according to claim 2, wherein the conductive member is disposed on an outer circumferential side of the fixed member.

9. The lens apparatus according to claim 2, further comprising an optical element,
wherein the conductive member is configured to rotate to move the optical element.

10. A lens apparatus comprising:
a conductive mount member; and
a nonconductive fixed member fixed on the mount member,
wherein the fixed member has a conductive pattern,
wherein the lens apparatus further comprises a first conductive member and a second conductive member, and
wherein the mount member and the first and second conductive members are electrically connected to each other via the conductive pattern.

11. The lens apparatus according to claim 10, wherein the first conductive member is disposed on an inner circumferential side of the fixed member, and the second conductive member is disposed on an outer circumferential side of the fixed member.

12. The lens apparatus according to claim 2, wherein the fixed member includes a first fixed member and a second fixed member, and the conductive pattern is formed on at least one of the first fixed member and the second fixed member.

13. An imaging system comprising:
the lens apparatus according to claim 1; and
an imaging apparatus to which the lens apparatus is attached via the mount member.

14. An imaging system according to claim 13, wherein the lens apparatus is detachable from the imaging apparatus.

15. An imaging system comprising:
the lens apparatus according to claim 2; and
an imaging apparatus to which the lens apparatus is attached via the mount member.

16. An imaging system comprising:
the lens apparatus according to claim 10; and
an imaging apparatus to which the lens apparatus is attached via the mount member.

* * * * *